United States Patent [19]

Yasuda et al.

[11] 4,306,240

[45] Dec. 15, 1981

[54] BEARING MEASURING SYSTEM FOR FREQUENCY MODULATION

[75] Inventors: Hyo Yasuda, Tokyo; Norio Ikeda, Tokorozawa, both of Japan

[73] Assignee: Taiyo Musen Co. Ltd., Tokyo, Japan

[21] Appl. No.: 62,778

[22] Filed: Aug. 1, 1979

[30] Foreign Application Priority Data

Mar. 12, 1979 [JP] Japan .................................. 54-27719

[51] Int. Cl.$^3$ ................................................ G01S 5/04
[52] U.S. Cl. .................................................. 343/121
[58] Field of Search ................... 343/113 R, 120, 121, 343/124

[56] References Cited

U.S. PATENT DOCUMENTS

| | | | |
|---|---|---|---|
| 3,156,916 | 11/1964 | Byatt | 343/124 |
| 3,553,699 | 1/1971 | Starkey et al. | 343/124 |
| 3,701,155 | 10/1972 | Adams | 343/124 |
| 3,872,477 | 3/1975 | King | 343/113 R |
| 3,916,411 | 10/1975 | Fiedler | 343/121 |

Primary Examiner—Theodore M. Blum
Attorney, Agent, or Firm—A. W. Breiner

[57] ABSTRACT

A bearing measuring system for determining the direction of arrival of a wave by rotating directional antennas or a goniometer to which the directional antennas are connected or rotating the directivity of such directional antennas or goniometer by electric means. The receiver of bearing measuring system of the type disclosed is usually constructed to determine the bearing of an amplitude modulated wave while confirming information about arriving waves. With a single receiver for frequency modulated waves it has been difficult to determine the bearing from adding the outputs of the directional antennas and the output of a nondirectional antenna while confirming information about arriving waves. With the system according to the present invention, it is possible with a single receiver to determine the bearing of the aforementioned frequency modulated waves while confirming information about the waves.

5 Claims, 3 Drawing Figures

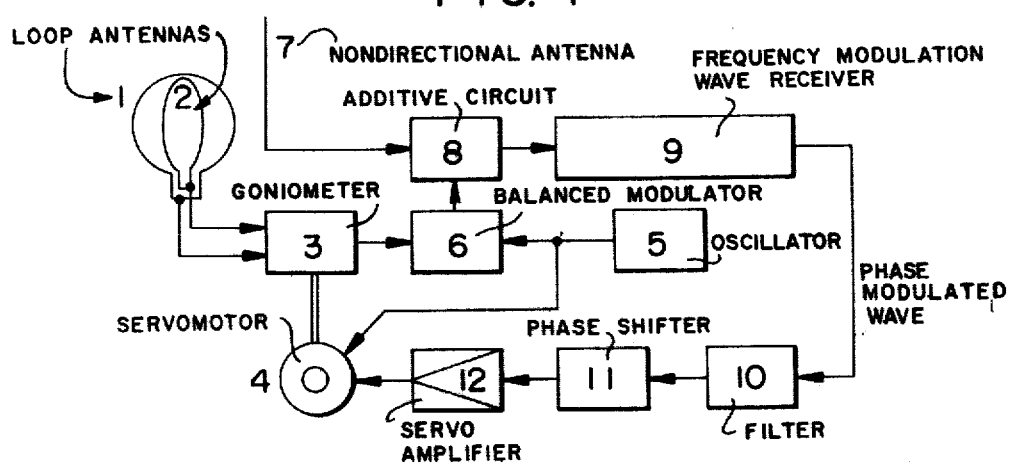
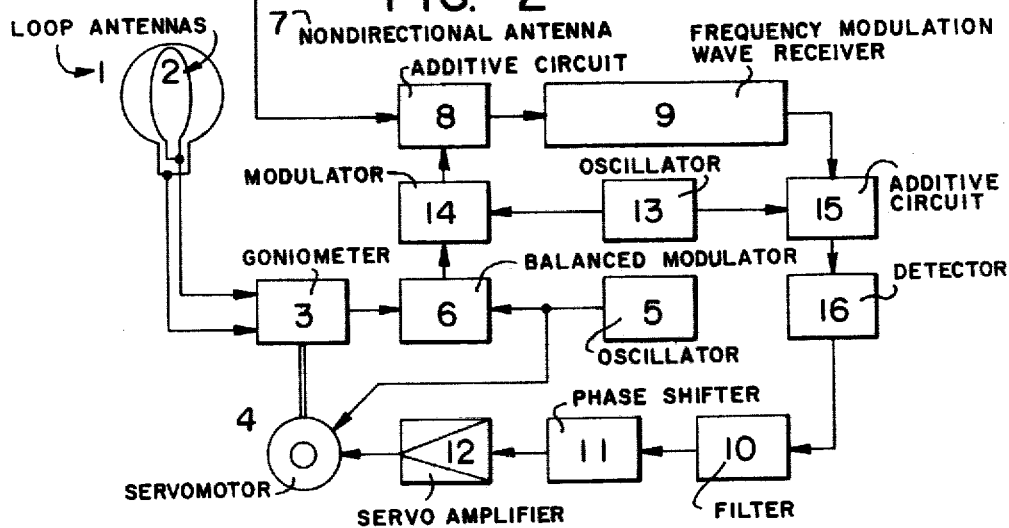

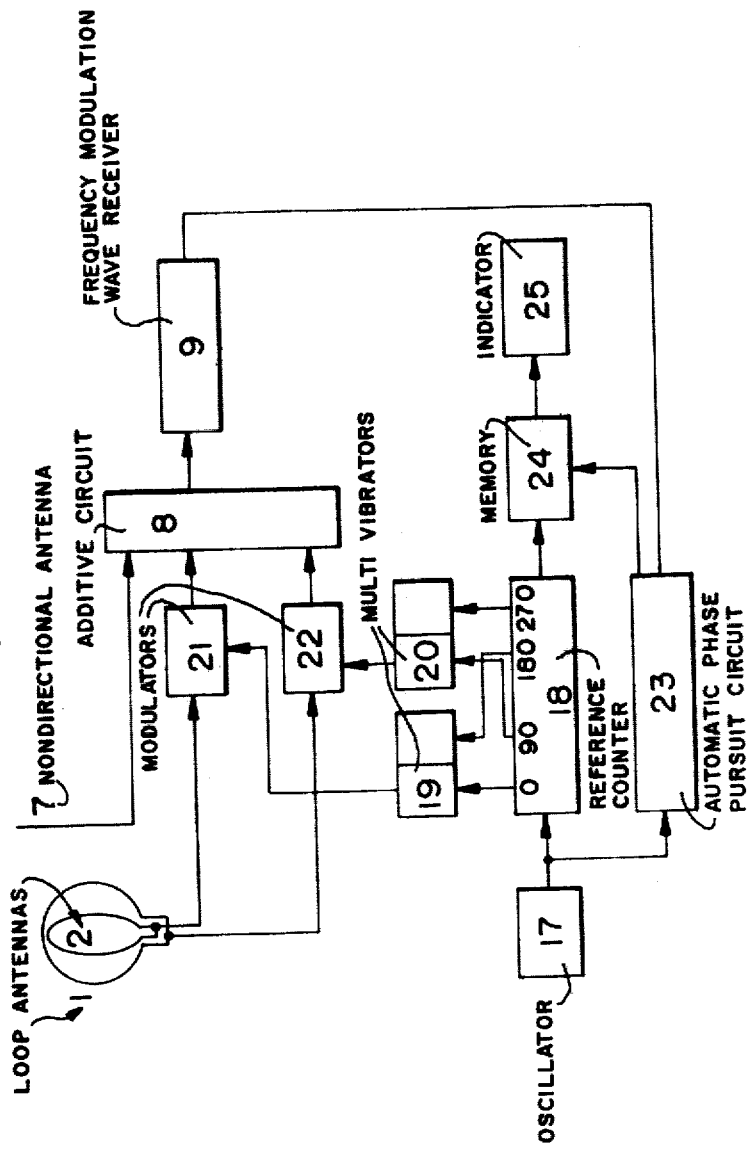

BEARING MEASURING SYSTEM FOR FREQUENCY MODULATION

BACKGROUND OF THE INVENTION

1. Field of the Invention

This invention relates to bearing measuring systems.

2. Description of the Prior Art

Prior art bearing measuring systems are known in which directional antennas or a goniometer to which directional antennas are connected are rotated or the directivity of such directional antennas or goniometer is electrically rotated and the outputs of such antennas and a 90° phase shifted output of a nondirectional antenna are combined to obtain a commonly termed cardioid characteristic while confirming information above a wave with a receiver for amplitude modulation. Also, it is known in the art to employ a system combining a system dealing with the measurement of the bearing of a frequency modulated wave and having a construction similar to that in the case of the afore-mentioned amplitude modulation with a system dealing with the information of the wave and having a construction similar to the usual frequency modulated wave receiver.

The afore-mentioned prior-art systems have required a special receiver for measuring the bearing by making use of a frequency modulated wave since it has been necessary to cause a 90° phase shift of either the output of the nondirectional antenna or the outputs of the directional antennas. Accordingly, such systems have not been put to practical use.

SUMMARY OF THE INVENTION

An object of the invention is to provide a system wherein it is not necessary to cause a 90° phase shift of the output of the non-directional antenna as mentioned above, and which can measure the bearing while confirming information about a wave without need of the afore-mentioned complicated receiver but using an ordinary receiver for frequency modulation.

The system according to the invention includes amplitude modulation of the outputs of directional antennas with one or a plurality of low frequency waves, combining the resultant outputs and the output of a nondirectional antenna without causing phase shift, leading the resultant output to a frequency modulated wave receiver and the provision of a directionfinder-bearing indicator sensitive to the output of the receiver.

BRIEF DESCRIPTION OF THE DRAWING

FIG. 1 is a block diagram showing one embodiment of the invention;

FIG. 2 is a block diagram showing another embodiment of the invention; and

FIG. 3 is a block diagram showing a further embodiment of the invention.

DETAILED DESCRIPTION OF PREFERRED EMBODIMENTS

Referring now to FIG. 1, which shows one embodiment of the invention, a pair of directional antennas, for instance loop antennas 1 and 2, are arranged perpendicular to each other, and their outputs are coupled to a goniometer 3, whose rotor is coupled to a servo-motor 4. The output of the goniometer 3 and the output of an oscillator 5 at a low frequency, for instance about 100 Hz so as not to disturb audio signals, are coupled to a balance modulator 6 for subjecting the goniometer output to amplitude modulation at a low frequency. The output of the modulator 6 and the output of a nondirectional antenna 7 are superimposed upon one another in an additive circuit 8, the output of which is coupled to a frequency modulation wave receiver 9 for demodulation. The demodulated output is coupled through a filter 10 to extract the component at the frequency of the output of the oscillator 5. The filter output is coupled after phase adjustment through a phase shifter 11 to a servo-amplifier 12. The servo-motor 4 is excited with the output of the oscillator 5 and driven with the output of the servo-amplifier 12.

In the above system, the output of the nondirectional antenna 7 coupled to the additive circuit 8 and the outputs of the directional antennas 1 and 2 coupled through the goniometer 3 are superimposed upon one another without phase shift. The amplitude of the output of the nondirectional antenna 7 is held constant, but the output of the goniometer 3 changes with the angular position thereof and is amplitude modulated with the output of the low frequency oscillator 5, and the output of the nondirectional antenna and the output of the goniometer 3 are 90 degrees out of phase with each other as mentioned above. Thus, the phase of the output of the additive circuit 8 changes according to the product of the output amplitude of the goniometer 3 and the output of the oscillator 5. Since this phase modulated wave is demodulated by the receiver 9 and coupled to the filter 10, a signal having the frequency of the oscillator 5 and with the amplitude varying with the output level of the goniometer 3 is extracted by the filter. This signal is amplified through the amplifier 12 to drive the servo-motor 4, so that with reduction of the output level of the goniometer 3 to zero with the rotation of the motor the drive input disappears to stop the motor 4. In other words, the goniometer 3 is stopped at a position at which the goniometer output is reduced to zero, so that the direction of arrival of the wave can be known from the stopping position.

FIG. 2 shows another embodiment of the invention. In this embodiment, an oscillator 13 at several kHz is provided at about 100 Hz as in the system of FIG. 1 in addition to the oscillator 5, and the output of a balanced modulator 6 like that in case of FIG. 1 and the output of the oscillator 13 are coupled to a modulator 14, the output of which is coupled together with the output of the nondirectional antenna 7 to the additive circuit 8. The output of the frequency modulated wave receiver 9 and the output of the oscillator 13 are superimposed upon each other in an additive circuit 15, the output of which is coupled through a detector 16 to a filter 10 such as in FIG. 1. In the modulator 14, the output of the modulator 6 is subjected to balanced modulation or on-off switched with the output of the oscillator 13, so that a phase modulated wave at several kHz is coupled to the receiver 9. In consequence, the demodulation sensitivity in the receiver is increased to permit a sufficiently high demodulated output to be obtained. By superimposing upon this output the output of the oscillator 13 an output having the frequency of the output of the oscillator 5 and modulated with the output level of the goniometer 3, similar to that in the system of FIG. 1, can be obtained.

While the preceding embodiments all use a servo-motor for stopping the goniometer at a position at which the output thereof is reduced to zero, it is also possible to continuously rotate the goniometer at a constant speed and display the relation between the angular position of the goniometer and the level of the aforementioned demodulated output on a cathoderay tube or the like or adjust the goniometer by manual adjustment and detect a position at which the demodulated output is minimum.

Further, while the above embodiments use a goniometer as a means for obtaining an output concerning the directivity, it is also possible to subject the outputs of the directional antennas to balanced modulation by electrically rotating the directivity, combine the modulated outputs and the output of the nondirectional antenna and couple the resultant output to the frequency modulated wave receiver for displaying the bearing on a numeral indicator by the co-operation of the outputs of the means for rotating the directivity and the receiver.

FIG. 3 shows a further embodiment having such a construction. Referring to FIG. 3, a reference counter 18, for instance capable of counting up to 360 in one step, counts output pulses of an oscillator 17 and transmits an output when its count is 0, 180, 90 and 270 to operate bi-stable multivibrators 19 and 20. The multivibrator 19 is operated with outputs produced at the counts of 0 and 180, and the other multi-vibrator 20 with outputs produced at the counts of 90 and 270. The outputs of the two multi-vibrators are used to modulate the outputs of the respective directional antennas 1 and 2 in modulators 21 and 22. The outputs of the modulators 21 and 22 are added with the output of the nondirectional antenna in an additive circuit 8, the output of which is led to a receiver 9. The outputs of the receiver 9 and oscillator 17 are coupled to an automatic phase detector circuit 23 comprising a phase counter, a comparator and so forth. When an automatic phase detection completion state is brought about, the circuit 23 produces an output to operate a memory 24 for memorizing the count of the reference counter 18. From the memorized value, numerical display of the bearing on the indicator 25 is obtained. It will be understood from the preferred embodiments of the invention described in the foregoing that the system according to the invention uses a frequency modulated communication wave and a receiver for receiving that wave and can determine the direction of arrival of that wave utilizing a simplified construction.

What we claim is:

1. A bearing determining system comprising a modulating means for amplitude modulating outputs of directional antennas with at least one low frequency, an additive circuit for superimposing the output of said modulating means and the output of a nondirectional antenna upon each other without phase shift, a frequency modulated wave receiver for receiving the output of said additive circuit and a bearing indicator means sensitive to said frequency modulated wave.

2. The bearing determining system according to claim 1, wherein said directional antenna outputs are coupled to a goniometer driven by a servo-motor, said servo-motor being stopped at a position at which the output of said goniometer is reduced to a minimum whereby the bearing to be determined is indicated by a pointer coupled to the goniometer.

3. The bearing determining system according to claim 1, wherein said directional antenna outputs are coupled to a goniometer continuously rotated at a constant speed for indicating the angular position of said goniometer representing the directivity as an image on a cathode-ray tube.

4. The bearing determining system according to claim 1, wherein said directional antenna outputs are coupled to a goniometer, said goniometer being manually operated to detect a position thereof, at which the output level of said receiver is minimum.

5. The bearing determining system according to claim 1, wherein outputs obtained by electrically rotating the directivity with said directional antenna outputs are coupled to a balanced modulator means for displaying the determined bearing on a numerical indicator.

* * * * *